US 8,054,466 B1

(12) United States Patent
Flanders et al.

(10) Patent No.: US 8,054,466 B1
(45) Date of Patent: Nov. 8, 2011

(54) SPECTROSCOPY WAVELENGTH AND AMPLITUDE REFERENCING SYSTEM AND METHOD

(75) Inventors: Dale C. Flanders, Lexington, MA (US); Yu Nathan Li, Lexington, MA (US); Mark E. Kuznetsov, Lexington, MA (US); Walid A. Atia, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 120 days.

(21) Appl. No.: 11/419,993

(22) Filed: May 23, 2006

Related U.S. Application Data

(60) Provisional application No. 60/683,585, filed on May 23, 2005.

(51) Int. Cl.
*G01B 9/02* (2006.01)
(52) U.S. Cl. .................................................... 356/451
(58) Field of Classification Search .................. 356/451, 356/519, 454; 372/31, 32
See application file for complete search history.

(56) References Cited

U.S. PATENT DOCUMENTS

| | | | | |
|---|---|---|---|---|
| 2,803,986 A * | 8/1957 | Choiniere et al. | ........... | 359/503 |
| 4,410,273 A * | 10/1983 | Mantz et al. | ........... | 356/319 |
| 5,291,266 A * | 3/1994 | Burns et al. | ........... | 356/477 |
| 6,160,826 A * | 12/2000 | Swanson et al. | ........... | 372/20 |
| 6,215,801 B1 * | 4/2001 | Ackerman et al. | ........... | 372/32 |
| 6,661,814 B1 * | 12/2003 | Chapman et al. | ........... | 372/6 |
| 6,856,400 B1 * | 2/2005 | Froggatt | ........... | 356/477 |
| 2002/0131737 A1 * | 9/2002 | Broeng et al. | ........... | 385/123 |
| 2002/0163942 A1 * | 11/2002 | Baillargeon et al. | ........... | 372/20 |
| 2004/0100686 A1 | 5/2004 | Flanders et al. | | |
| 2005/0083533 A1 | 4/2005 | Atia et al. | | |
| 2006/0065834 A1 * | 3/2006 | Flanders et al. | ........... | 250/339.07 |
| 2006/0072632 A1 | 4/2006 | Flanders et al. | | |

OTHER PUBLICATIONS

Optical, Tunable Filter-Based Micro-Instrumentation for Industrial Applications, ISA Expo 2003.*

* cited by examiner

*Primary Examiner* — Tarifur Chowdhury
*Assistant Examiner* — Jonathon Cook
(74) *Attorney, Agent, or Firm* — Houston Eliseeva, LLP

(57) ABSTRACT

A spectroscopy wavelength and amplitude referencing system comprises an optical bench receiving a tunable optical signal from a tunable signal source, a wavelength reference detector on the bench for determining a wavelength of the tunable optical signal, an amplitude reference detector on the bench for determining an amplitude of the tunable optical signal and an output optical signal fiber for transmitting the tunable optical signal to a sample. Also, spectroscopy system controller determines a spectral response of the sample to the tunable optical signal by determining an instantaneous wavelength of the tunable optical signal by reference to the wavelength reference detector.

15 Claims, 3 Drawing Sheets

US 8,054,466 B1

SPECTROSCOPY WAVELENGTH AND AMPLITUDE REFERENCING SYSTEM AND METHOD

RELATED APPLICATIONS

This application claims the benefit under 35 USC 119(e) of U.S. Provisional Application No. 60/683,585, filed on May 23, 2005, which is incorporated herein by reference in its entirety.

BACKGROUND OF THE INVENTION

All spectrometers require a radiation source, a wavelength selective or encoding device, and a detector. Analytical spectrometers require a means to transport light to and from a sample, and the sample is commonly examined in transmission or reflection.

An emerging spectrometer design standard employs a semiconductor light source, a scanning filter, and a single element detector; light is carried to and from the sample via fiber optics, and a wide variety of accessories, cells and probes, can be used as the sample interface. Examples of such systems are described in U.S. Pat. Appl. Publ. Nos. US 2006/0072632 A1 and US 2005/0083533, which are incorporated herein by this reference in their entirety. These systems use small, powerful, and efficient semiconductor sources combined with small, stable and efficient microelectromechanical system (MEMS) tunable filters. Theses spectrometers employ MEMS-based tunable Fabry-Perot filters in a pre-dispersive mode; that is with the wavelength selective device before the sample being examined. All the components are affixed to small, such as 14 millimeter (mm) long aluminum nitride, optical benches that sit atop thermoelectric coolers, and all optical coupling on this bench is via free-space micro optics. Collection fiber(s) deliver transmitted or reflected light back to the spectrometer, where a single-element InGaAs detector and transimpedance amplifier convert the light into electrical signals for processing.

SUMMARY OF THE INVENTION

The present invention concerns a wavelength and amplitude referencing system for semiconductor source spectroscopy systems.

In general according to one aspect, the invention features a spectroscopy wavelength and amplitude referencing system, comprising an optical bench receiving a tunable optical signal from a tunable signal source, a wavelength reference detector on the bench for determining a wavelength of the tunable optical signal, an amplitude reference detector on the bench for determining an amplitude of the tunable optical signal and an output optical signal fiber for transmitting the tunable optical signal to a sample.

In general according to another aspect, the invention features spectroscopy wavelength referencing system, comprising a wavelength reference detector for determining a wavelength of a tunable optical signal, a signal detector for detecting light from a sample illuminated by the tunable optical signal, and a spectroscopy system controller for determining a spectral response of the sample to the tunable optical signal by determining an instantaneous wavelength of the tunable optical signal by reference to the wavelength reference detector.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
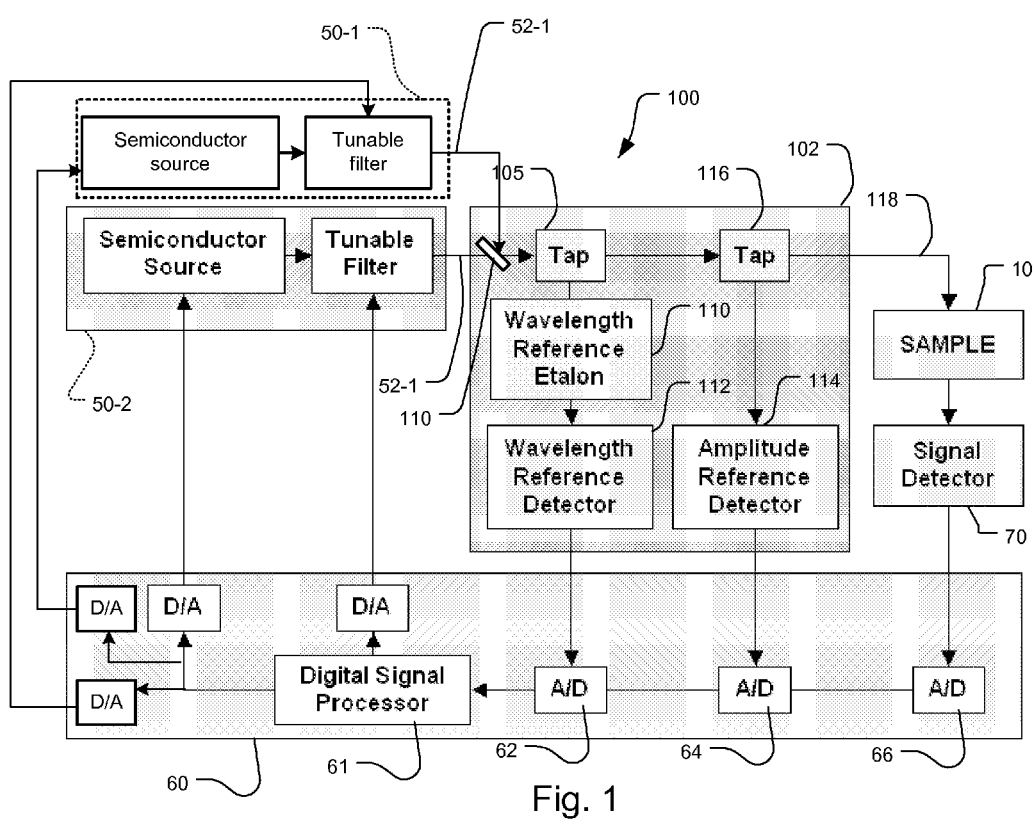
FIG. 1 is block diagram of the inventive spectroscopy system.

FIG. 1 shows the spectroscopy system. Two tunable semiconductor sources 50-1 and 50-1 are provided to generate tunable signals in different, adjacent spectral bands to increase spectral range or in the same band to increase power. In the preferred embodiment, the semiconductor sources have semiconductor optical amplifiers and MEMS Fabry Perot tunable filters to create external cavity tunable lasers as described in US 2006/0072632 A1. In other embodiments, the semiconductor sources are super luminescent light emitting diodes as described in US 2005/0083533.

Each of semiconductor sources and tunable filters of the tunable sources 50-1, 50-2 are controlled by a system controller 60. Specifically a digital signal processor 61 drives the sources and tunable filters via separate digital to analog converters D/A.

Respective single mode optical fibers 52-1 and 52-2 carry the tunable signals from each of the sources 50-1, 50-2.

The wavelength amplitude referencing system 100 combines the tunable signals from each of the sources 50-1, 50-2 onto output fiber 118 while also performing amplitude and wavelength detection.

In more detail, a polarizing beam combiner 110 is used to combine the tunable signals for each of the sources. A wavelength reference tap 105 directs a portion of the combined beam to a quartz reference etalon 110 and a wavelength reference detector 112. An amplitude reference tap 116 directs a portion of the combined beam to an amplitude reference detector 114. Each of these detectors 112, 114 is monitored by the system controller 60 via separate analog to digital converters 62, 64.

In the preferred embodiment, every point of every scan is referenced, resulting in unparalleled long-term stability. As the sources 50-1, 50-2 of the spectrometer scan, the signal from the wavelength reference detector 112 is a fringe pattern, analogous to the He—Ne reference signal in an FT-IR. This provides real-time wavelength referencing.

An optical bench 102 on which the reference system 100 is implemented is thermostat-controlled, ensuring both short- and long-term dimensional stability for the etalon 110, and thus both short- and long-term wavelength reproducibility.

Figure 2:
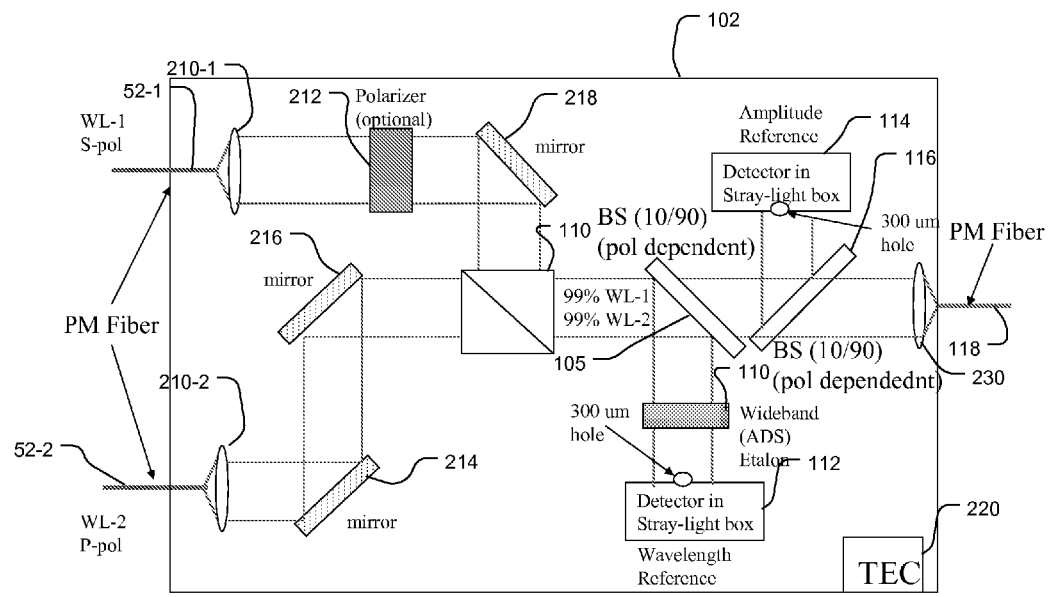
FIG. 2 is a schematic diagram of the inventive wavelength and amplitude referencing system.

FIG. 2 shows the detailed layout of the referencing system 100. The beams from each of the fibers 52-1, 52-2 are collimated by lenses 210-1, 210-2. The beams have opposite polarizations from the typically highly polarized semiconductor sources 50-1, 50-2. Preferably the fibers 52-1, 52-2 are polarization controlling fiber such as polarization maintaining fiber. An optional polarizer 212 is added in some implementations to improve polarization diversity.

Mirrors 214, 216, 218 are used to bring the beams from the sources together at the polarizing beam combiner cube 110.

In the preferred embodiments, the detectors 112, 114 are constructed as described in U.S. patent application Ser. No. 10/392,353, filed on Mar. 19, 2003, entitled Stray Light Insensitive Detector System and Amplifier, which is incorporated herein by this reference in its entirety.

Also shown in the thermoelectric cooler 220 under the bench 102.

Figure 3:
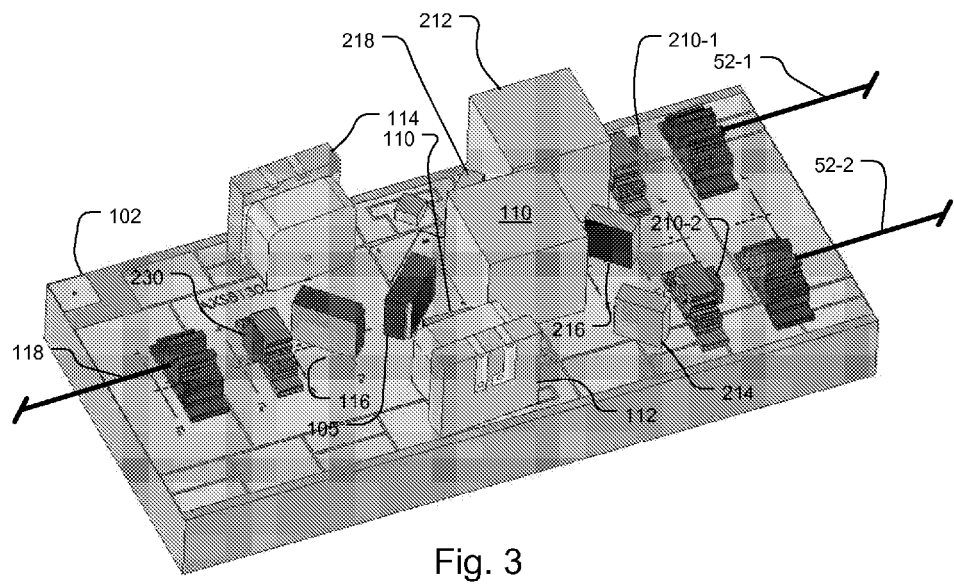
FIG. 3 is a scale perspective view of the inventive wavelength and amplitude referencing system.

FIG. 3 shows the physical implementation on the single bench 102 in one example.

Figure 4:
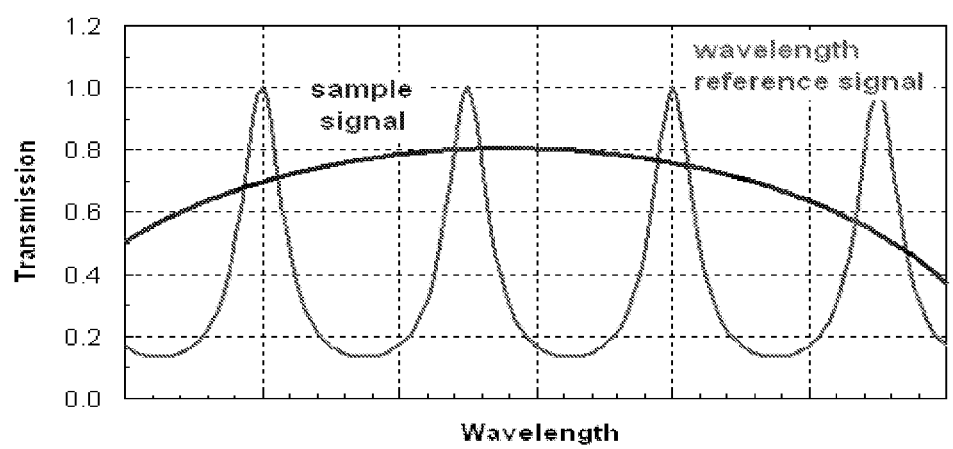
FIG. 4 is a plot of showing the transmission of the signal sample and reference signal as a function of wavelength.

Merely linearizing the voltage drive to the tunable filters of the tunable sources 50-1, 50-2 will not guarantee a long term, linear wavelength scale. To assure this, real-time calibration is done in the preferred embodiment. In this calibration, it is assumed that there is wavelength scan linearity between fringe peaks of the etalon 110 in one example, but not necessarily over the full range. The spectrometer collects data points at 12 GHz (0.4 cm$^{-1}$) spacing, and the etalon fringes occur at ~400 GHz (~13 cm$^{-1}$ or ~3 nm at 1500 nm) spacing (FIG. 4). The spectrometer collects three signal channels simultaneously, using 24-bit A/D converters. These channels are signal versus time 66, wavelength versus time 62 and amplitude versus time 64 (see FIG. 1). From the signal versus time and wavelength versus time data, the internal spectrometer electronics resample the signal data to produce a signal versus wavelength plot. This is done in real time for every single scan of the spectrometer, eliminating any short-term drift.

The optical bench 102 is temperature controlled in an analog loop. The temperature is measured by a thermistor, the output of which goes to a bridge circuit. The bench temperature is controlled to within 0.1° C.; which means that the etalon frequency shift is then itself controlled within 0.2 GHz, which equals 0.006 cm$^{-1}$ at λ=1500 nm. The derivation of this is shown below.

The amplitude detector 114 measures, in real time, the output power of the tunable source. The same principles are used, as described above for wavelength referencing. Again, the beamsplitter 116 is soldered to the thermostatted optical bench 102, inside a sealed module, ensuring long term stability, and the detector 114 is also thermostatted. The output amplitude of the tunable source is measured at each point, and is divided into the sample signal, to eliminate both short- and long-term source amplitude drifts. Any electronic delays within the spectrometer are measured and compensated for during factory calibration.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical referencing system, comprising:
   an optical bench receiving a tunable optical signal from a tunable signal source via an input polarization controlling optical fiber;
   a wavelength reference detector mounted on the bench for determining a wavelength of the tunable optical signal;
   a wavelength reference mounted on the optical bench for filtering the tunable optical signal to generate a fringe pattern that is detected by the wavelength reference detector;
   an amplitude reference detector mounted on the optical bench for determining an amplitude of the tunable optical signal;
   an output optical signal polarization controlling fiber for transmitting the tunable optical signal directly to a sample from the optical bench;
   a signal detector for directly receiving light from the sample illuminated by the tunable optical signal; and
   a controller that simultaneously monitors the wavelength reference detector to produce wavelength data as a function of time and the amplitude reference detector to produce amplitude data as a function of time for the tunable optical signal.

2. An optical referencing as claimed in claim 1, wherein the wavelength reference comprises an etalon.

3. An optical referencing system as claimed in claim 1, further comprising a thermoelectric cooler on a backside of the optical bench for controlling a temperature of the system.

4. An optical referencing system, comprising:
   an optical bench receiving a tunable optical signal from a tunable signal source via an input polarization controlling optical fiber;
   a wavelength reference detector, mounted on the optical bench, for determining a wavelength of the tunable optical signal;
   a wavelength reference, mounted on the optical bench, for filtering the tunable optical signal to generate a fringe pattern that is detected by the wavelength reference detector;
   an output fiber for transmitting the tunable optical signal directly from the optical bench to a sample;
   a signal detector for detecting light directly from the sample illuminated by the tunable optical signal; and
   a controller that simultaneously monitors the wavelength reference detector to produce wavelength data as a function of time and the a signal detector to produce signal data as a function of time with at least one analog to digital converter as the tunable signal is wavelength scanned.

5. An optical referencing system as claimed in claim 4, further comprising:
   a wavelength analog to digital converter for converting and providing a response of the wavelength reference detector to the controller as the wavelength data;
   a signal analog to digital converter for converting and providing the response of the signal detector to the controller as the signal data.

6. An optical referencing system as claimed in claim 5, further comprising:
   an amplitude reference detector, mounted on the optical bench, for determining an amplitude of the tunable optical signal;
   an amplitude analog to digital converter for converting and providing the response of the amplitude reference detector to the controller as amplitude data;
   wherein the controller simultaneously monitors the response of the wavelength reference detector, the amplitude reference detector, and the signal detector, via the wavelength analog to digital converter, the signal analog to digital converter, and the amplitude analog to digital converter, to amplitude reference a scan of the sample by the tunable signal during the scan by dividing the amplitude data into the sample data to compensate for amplitude drift of the tunable signal over the wavelength scan.

7. An optical referencing system as claimed in claim 4, wherein the wavelength reference comprises an etalon.

8. An optical referencing system as claimed in claim 4, further comprising a thermoelectric cooler on a backside of the optical bench for controlling a temperature of the system.

9. An optical referencing system, comprising:
   an optical bench receiving a first tunable optical signal from a first tunable signal source via a first optical fiber and receiving a second tunable optical signal from a second tunable signal source via a second optical fiber;
   a combiner mounted on the bench for combining the first tunable signal and the second tunable signal into a common beam of a combined optical signal on the optical bench;
   a tap for splitting the combined optical signal;
   a wavelength reference detector mounted on the bench for receiving a first portion of the combined optical signal from the tap and determining a wavelength of the combined optical signal;
   a wavelength reference mounted on the bench for filtering the combined optical signal from the tap to generate a fringe pattern that is detected by the wavelength reference detector; and
   an output optical signal fiber for transmitting a second portion of the combined optical signal directly from the tap to a sample, with a signal detector directly receiving light from the sample illuminated by the combined optical signal.

10. An optical as claimed in claim 9, wherein the combiner is a polarization combiner.

11. An optical as claimed in claim 9, further comprising a thermoelectric cooler on a backside of the optical bench for controlling a temperature of the system.

12. An optical referencing system as claimed in claim 9, further comprising:
   a controller;
   a wavelength analog to digital converter for converting and providing a response of the wavelength reference detector to the controller;
   a signal analog to digital converter for converting and providing the response of the signal detector to the controller;
   wherein the controller simultaneously monitors the response of the wavelength reference detector and the signal detector, via the wavelength analog to digital converter and the signal analog to digital converter, to wavelength reference a scan of the sample by the combined signal.

13. An optical referencing system as claimed in claim 12, further comprising:
   an amplitude reference detector mounted on the bench for determining an amplitude of the tunable optical signal;
   an amplitude analog to digital converter for converting and providing the response of the amplitude reference detector to the spectroscopy controller;
   wherein the controller simultaneously monitors the response of the wavelength reference detector, the amplitude reference detector, and the signal detector, via the wavelength analog to digital converter, the signal analog to digital converter, and the amplitude analog to digital converter, to wavelength and amplitude reference a scan of sample by the combined optical signal during the scan.

14. An optical referencing system, comprising:
   an optical bench receiving a first tunable optical signal from a first tunable signal source via a first optical fiber and receiving a second tunable optical signal from a second tunable signal source via a second optical fiber;
   a polarization combiner mounted on the bench for combining the first tunable signal and the second tunable signal into a common beam of a combined optical signal on the optical bench;
   a first lens on the bench for collimating the first tunable optical signal to pass through the combiner;
   a second lens on the bench for collimating the second tunable optical signal to pass through the combiner;
   a wavelength reference detector mounted on the bench for determining a wavelength of the combined optical signal;
   a wavelength reference mounted on the bench for filtering the combined optical signal to generate a fringe pattern that is detected by the wavelength reference detector; and
   a third lens on the bench for coupling the combined optical signal into an output optical fiber, said output optical fiber transmitting the combined optical signal directly from the bench to a sample, with a signal detector directly receiving light from the sample illuminated by the combined optical signal.

15. An optical referencing system as claimed in claim 14, further comprising a thermoelectric cooler on a backside of the optical bench for controlling a temperature of the system.

* * * * *

UNITED STATES PATENT AND TRADEMARK OFFICE
CERTIFICATE OF CORRECTION

| | | |
|---|---|---|
| PATENT NO. | : 8,054,466 B1 | Page 1 of 1 |
| APPLICATION NO. | : 11/419993 | |
| DATED | : November 8, 2011 | |
| INVENTOR(S) | : Dale C. Flanders et al. | |

It is certified that error appears in the above-identified patent and that said Letters Patent is hereby corrected as shown below:

IN THE CLAIMS:

In column 4, line 42, claim 4, after the word "the" delete the letter "a".

Signed and Sealed this
Twenty-fourth Day of January, 2012

David J. Kappos
*Director of the United States Patent and Trademark Office*